United States Patent
Baka

[19]

[11] Patent Number: 5,848,629
[45] Date of Patent: Dec. 15, 1998

[54] NON-ROTATING AWNING LOCK

[75] Inventor: Gregory J. Baka, Kendallville, Ind.

[73] Assignee: White Consolidated Industries, Inc., Cleveland, Ohio

[21] Appl. No.: 770,139

[22] Filed: Dec. 19, 1996

[51] Int. Cl.$^6$ ................................................. E04F 10/06
[52] U.S. Cl. ........................ 160/67; 160/302; 188/82.34; 188/82.7
[58] Field of Search .............................. 160/66, 67, 292, 160/300, 301, 302, 305, 315; 188/82.2, 82.3, 82.34, 82.7

[56] References Cited

U.S. PATENT DOCUMENTS

| | | |
|---|---|---|
| 1,835,675 | 12/1931 | Smith, Sr. et al. . |
| 2,134,420 | 10/1938 | Smith, Sr. . |
| 2,204,847 | 6/1940 | Ebsworth . |
| 2,983,278 | 7/1961 | Rice . |
| 3,102,584 | 9/1963 | Znamirowski . |
| 3,870,096 | 3/1975 | Horrell . |
| 4,112,996 | 9/1978 | Fohl . |
| 4,125,142 | 11/1978 | Fohl . |
| 4,524,791 | 6/1985 | Greer . |
| 4,530,389 | 7/1985 | Quinn et al. . |
| 4,576,192 | 3/1986 | Duda . |
| 4,602,890 | 7/1986 | Duda . |
| 4,607,654 | 8/1986 | Duda . |
| 4,705,148 | 11/1987 | Zindler . |
| 4,759,396 | 7/1988 | Quinn . |
| 4,770,223 | 9/1988 | Ouellette . |
| 4,832,278 | 5/1989 | Sugeta . |
| 5,732,756 | 3/1998 | Malott . |

*Primary Examiner*—Blair M. Johnson
*Attorney, Agent, or Firm*—Pearne, Gordon, McCoy & Granger LLP

[57] ABSTRACT

A lock assembly for an awning roller adapted for having an awning rolled thereon and rotationally supported by a rod includes first and second pawls. The first pawl prevents relative rotation between the roller and the rod in one direction and the second pawl prevents relative rotation between the roller and the rod in the other direction. An end cap is mounted on an end of the roller and forms a gear which rotates with the roller. The gear has teeth forming stops. A cup-shaped housing faces the end of the roller at the gear and is secured to the rod to prevent relative rotation therebetween. The first and second pawls are pivotally mounted to said support for engaging the stops and engaging generally opposite sides of the gear. A leaf spring biases the first and second pawls toward engagement with the stops. A selector lever is engageable with the first and second pawls for selectively disengaging either of the first and second pawls from the stops to permit rotation of the roller a respective one of the directions. Alternatively, the selector lever engages neither of the pawls to prevent rotation in either direction. The selector lever has a handle which extends through the housing near the bottom of the housing and does not rotate with the roller so that the handle remains easily accessible at all times.

22 Claims, 8 Drawing Sheets

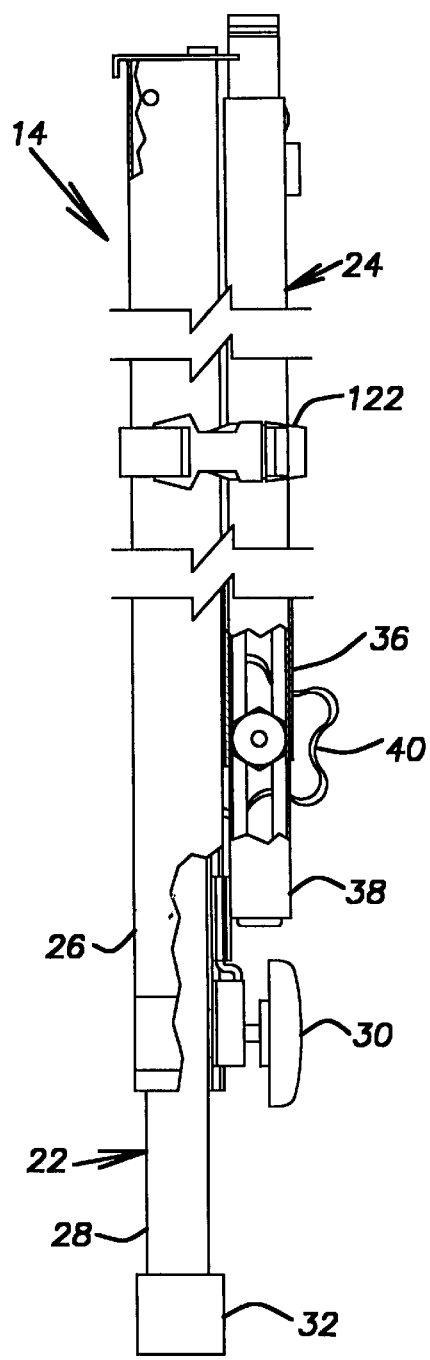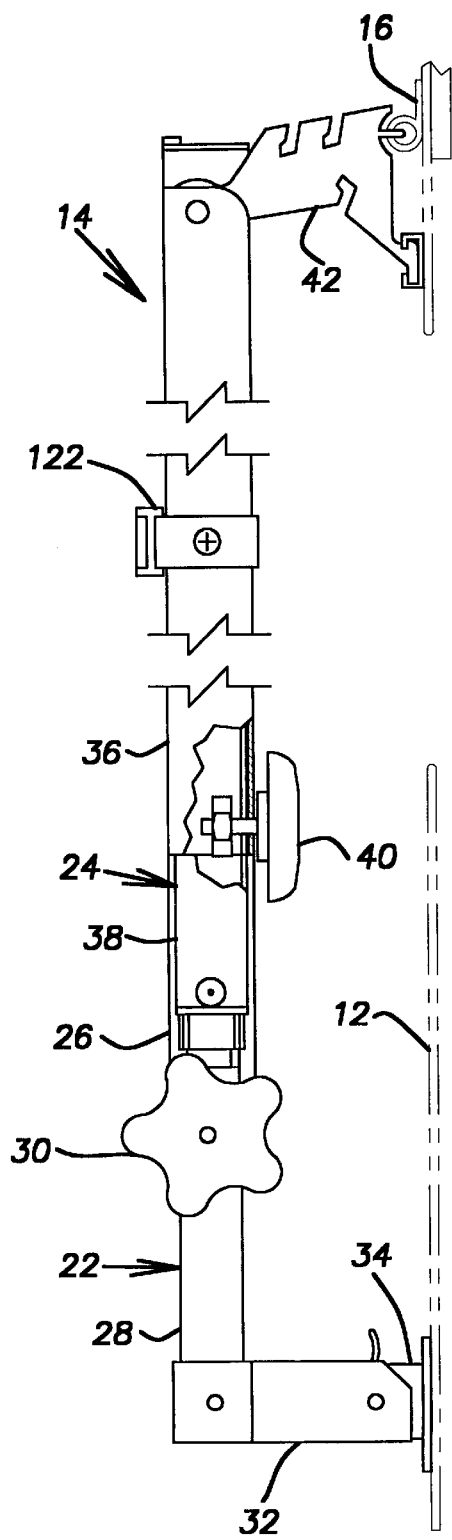
Fig.4
Fig.5

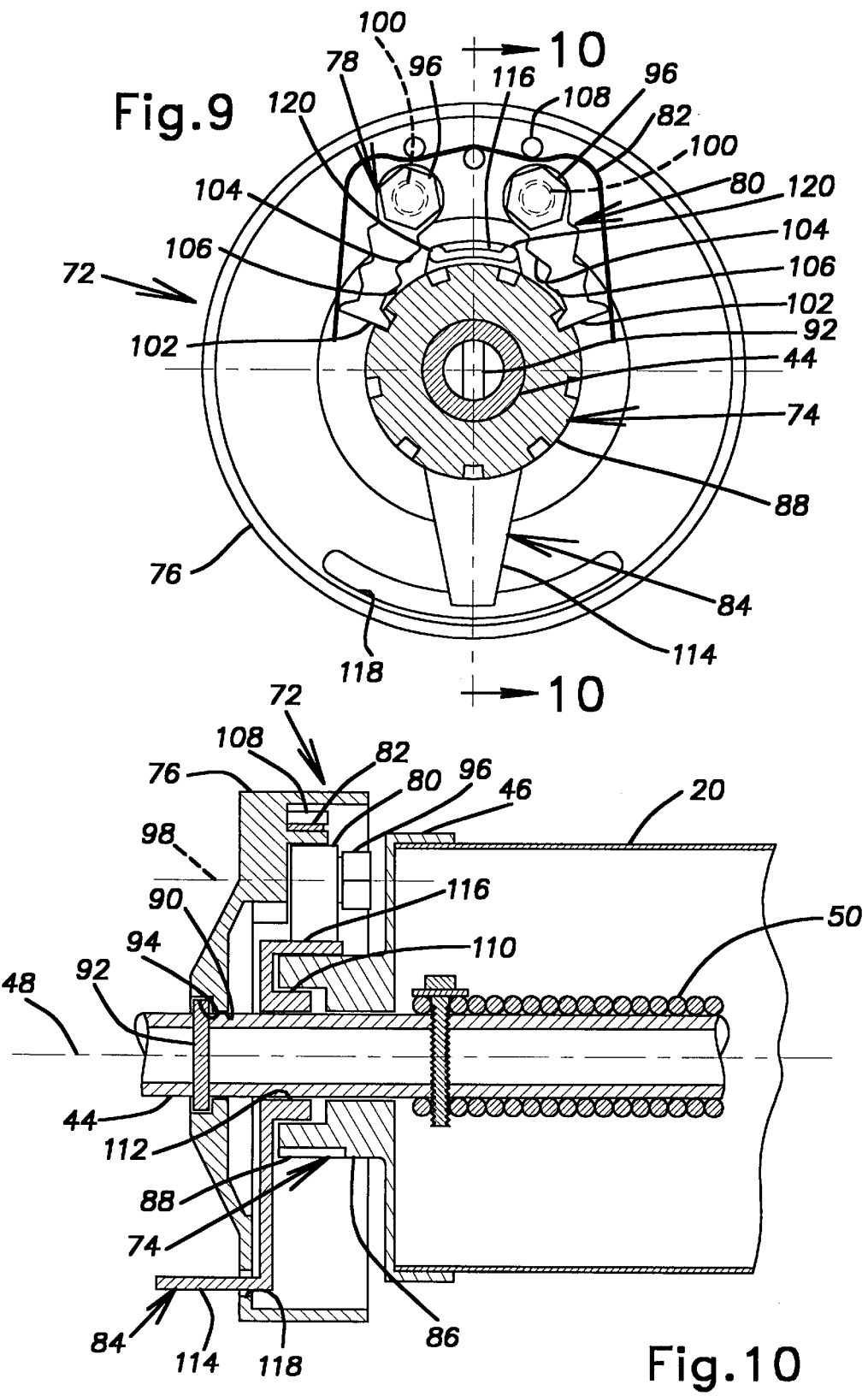

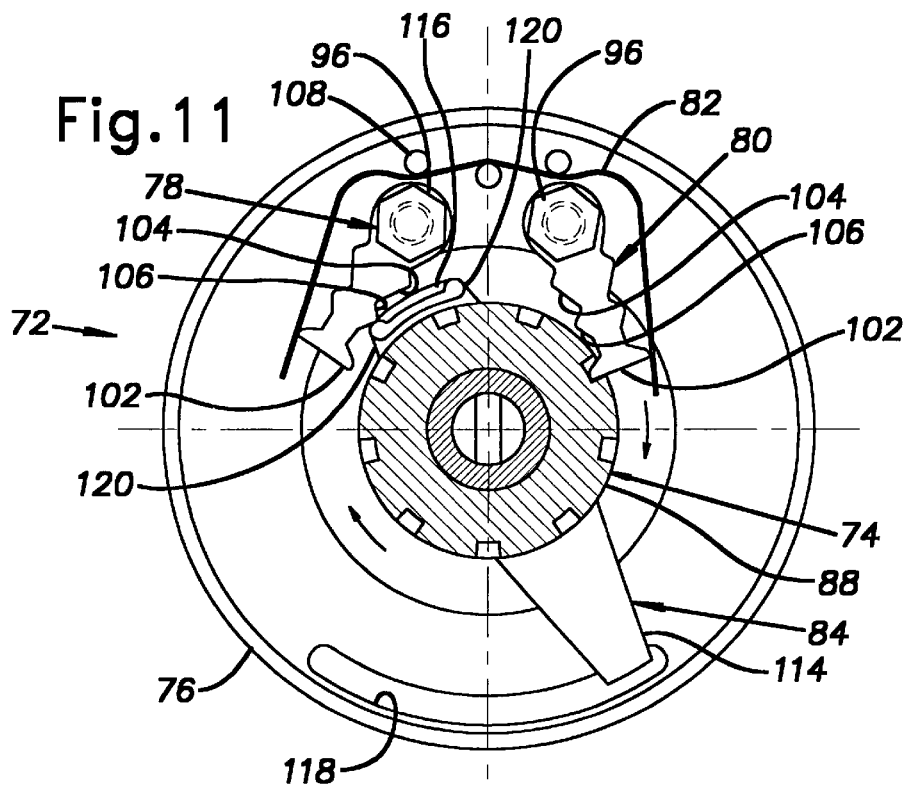
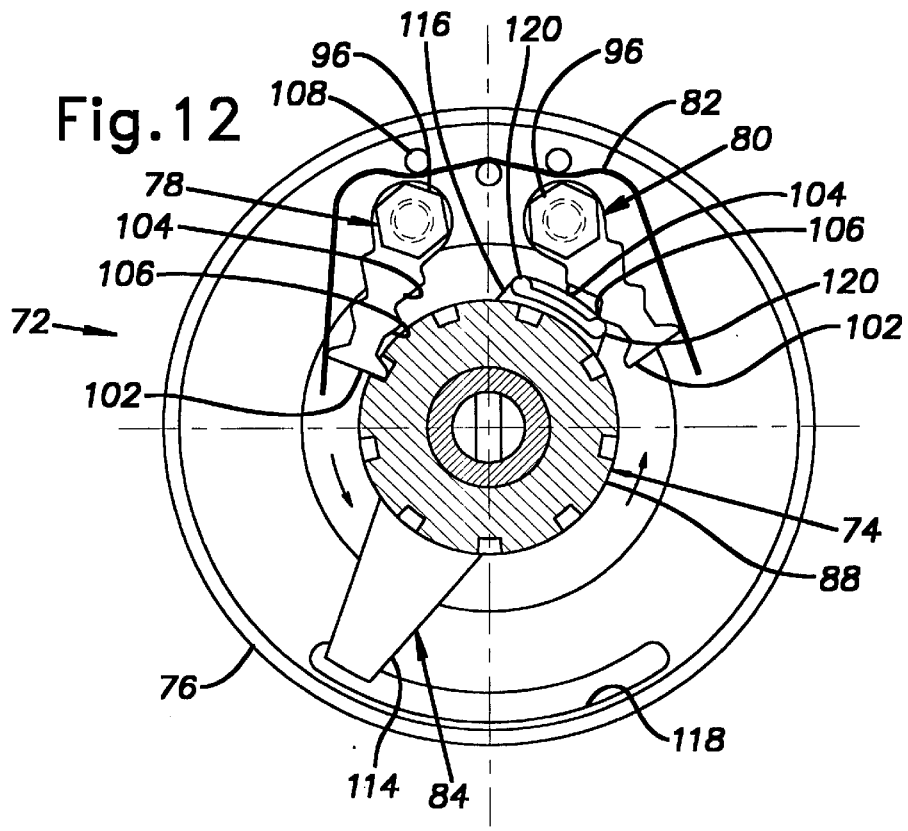

NON-ROTATING AWNING LOCK

BACKGROUND OF THE INVENTION

The present invention generally relates to retractable awnings and, more specifically, to lock assemblies for the retractable awnings.

There are a number of known retractable awning assemblies that support an awning to create a sheltered area. Such awning assemblies have been designed for use on mobile structures such as, for example, recreational vehicles and mobile homes. When the awning assembly is mounted on a mobile vehicle and stored in a retracted position, wind currents and other movements caused by the moving vehicle can tend to move the awning assembly from the retracted position to an extended position by unfurling the awning or canopy portion of the awning assembly. When the awning assembly is used in an extended position, wind currents and the like can also tend to move the awning toward a retracted position and can sometimes make it difficult to maintain the awning in a fully extended position. Accordingly, the awning assemblies must have lock systems for retaining the awning in either the retracted position or the extended position.

Most modern awning assemblies have a roller which is mounted on the end of a pair of support arms so as to be moved between the retracted and extended positions. The awning is adapted to be furled or wrapped around the roller as it is moved from the extended position to the retracted position. When moving the awning assemblies, particularly large awning assemblies, it is desirable to control movement of the roller by permitting rotation of the roller in only one direction at a time. The required direction depends on whether the awning is being retracted or extended.

Many lock assemblies have been designed for controlling and/or preventing movement of the roller. While these prior lock assemblies may be somewhat effective, they tend to be difficult to operate and are particularly difficult to operate when at remote locations. Some lock assemblies rotate with the roller and can end up out of the reach and/or the view of the operator. Other lock assemblies require complicated mechanisms or movements which are difficult to operate when the lock assembly is out of the reach and/or out of the view of the operator. Most lock assemblies operate to prevent rotation of the roller in one direction or the other but cannot fully lock the awning against rotation in both directions. Accordingly, there is a need in the art for an improved lock assembly for a retractable awning.

BRIEF SUMMARY OF THE INVENTION

The present invention provides a lock assembly for an awning roller which overcomes at least some of the above-noted problems of the related art. According to the present invention the lock assembly includes a roller adapted for having an awning rolled thereon and a rod defining a longitudinal axis of rotation of the roller. At least one stop is rigidly connected to the roller for rotation therewith. A support is rigidly secured to the rod to prevent relative rotation therebetween and a first pawl is pivotally mounted to the support for engaging the stop so as to prevent relative rotation between the roller and the rod in at least one direction.

In a preferred embodiment of the invention a second pawl is pivotally mounted to the support for engaging the stop so as to prevent relative rotation between the roller and the rod. The first pawl prevents relative rotation between the roller and the rod in one direction and the second pawl prevents relative rotation between the roller and the rod in the other direction. Preferably, a gear is provided which has teeth forming the stops and the first and second pawls are engagable with opposite sides of the gear.

BRIEF DESCRIPTION OF THE SEVERAL VIEWS OF THE DRAWING

These and further features of the present invention will be apparent with reference to the following description and drawings, wherein:

FIG. 4 is a front elevational view of a support arm and a rafter arm of the awning assembly in a fully retracted position;

FIG. 5 is an end elevational view of the support arm and the rafter arm in a fully retracted position;

FIG. 9 is an elevational view of a roller lock of the awning assembly, in cross-section, taken along line 9—9 of FIG. 7;

FIG. 10 is an elevational view, in cross-section, taken along line 10—10 of FIG. 9;

FIG. 11 is an elevational view, in cross-section, similar to FIG. 9 but with the roller lock in a "roll-up" position; and FIG. 12 is an elevational view, in cross-section, similar to FIG. 9 but with the roller lock in a "roll-down" position .

DETAILED DESCRIPTION OF THE INVENTION

Figure 1:
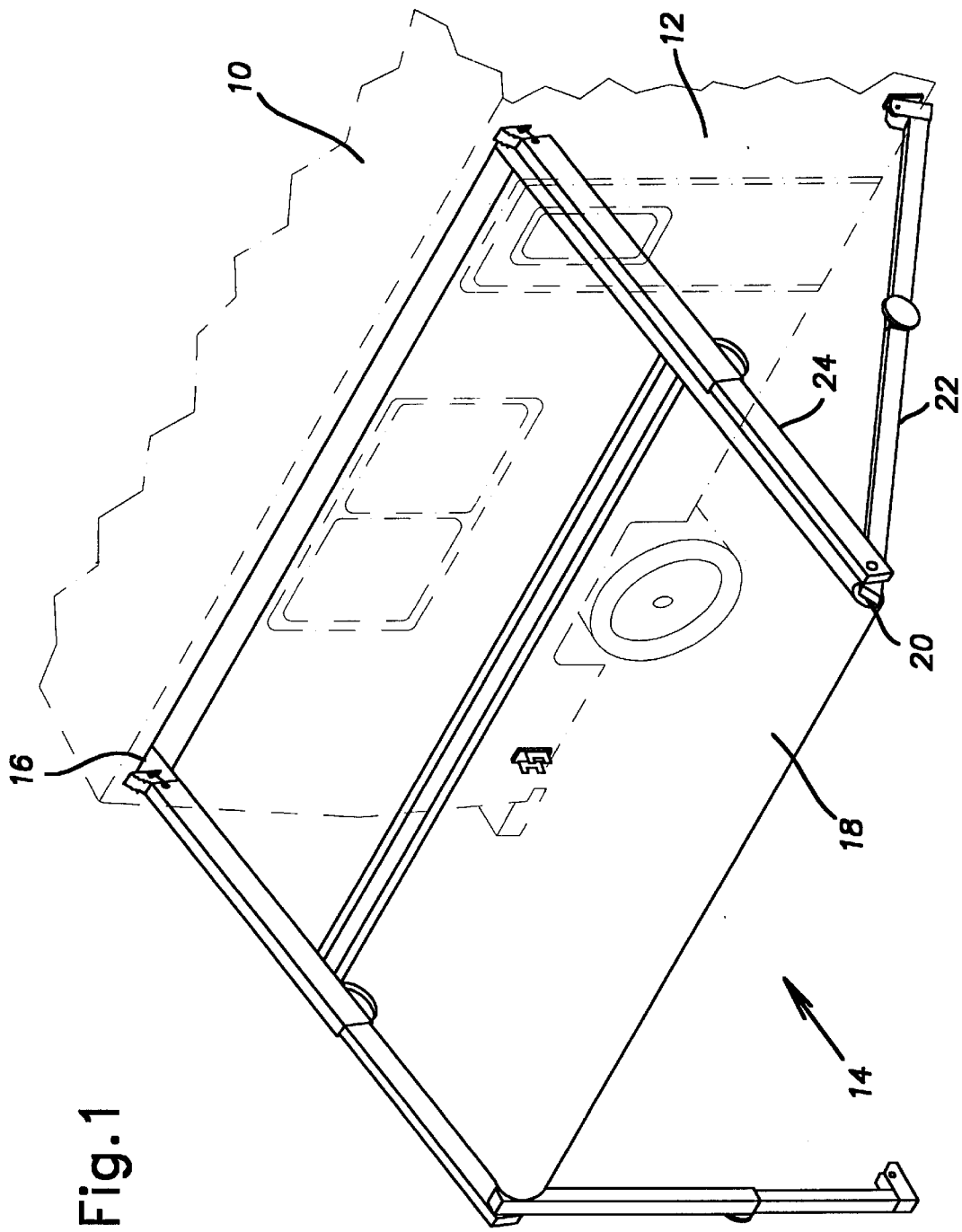
FIG. 1 is a perspective view of a recreational vehicle having an awning assembly according to the present invention mounted thereon.

FIG. 1 illustrates a recreational vehicle 10 having a generally vertical side wall 12 with an awning assembly 14 mounted thereon. The awning assembly 14 includes an awning rail 16 mounted on the side wall 12 and an awning 18 rollable on a roller 20. The roller 20 is preferably a roll-formed steel tube as described, for example, in U.S. Pat. No. 5,351,736. The leading edge of the awning 18 is supported by a pair of support arms 22 and the trailing edge of the awning 18 is secured to the awning rail 16. The top ends of the support arms 22 are connected to the ends of the roller 20 and the bottom ends of the support arms 22 are removably mounted on the side wall 12 or rested on a ground surface. A pair of rafter arms 24 are disposed between the leading and trailing edges of the awning 18 to maintain the awning 18 in tension. The inner ends of the rafter arms 24 are pivotally secured to the awning rail 16 and the outer ends of the rafter arms 24 are pivotally secured to the support arms 22.

Referring to FIGS. 2–5, each of the support arms 22 include an upper arm 26 and a lower arm 28 slidingly received within the upper arm 26. The upper and lower arms 26, 28 are frictionally locked relative to each other by a screw/knob assembly 30. The top end of the upper arm 26 is pivotally connected to the end of the roller 20 which is rotatably mounted as described in more detail below. The bottom end of the lower arm 28 has a foot 32 pivotally secured thereto which is removably mounted to the side wall 12 in a foot bracket 34.

Each of the rafter arms 24 includes an inboard arm 36 and an outboard 38 arm slidingly received within the inboard arm 36. The inboard and outboard arms 36, 38 are frictionally locked relative to each other by a screw/knob assembly 40. The inner end of the inboard arm 36 is pivotally mounted to a pivot support 42 secured to the awning rail 16. The outer end of the outboard arm 38 is slidably and pivotally mounted to the upper arm 26 of the support arm 22 as described in more detail below.

Figure 6:
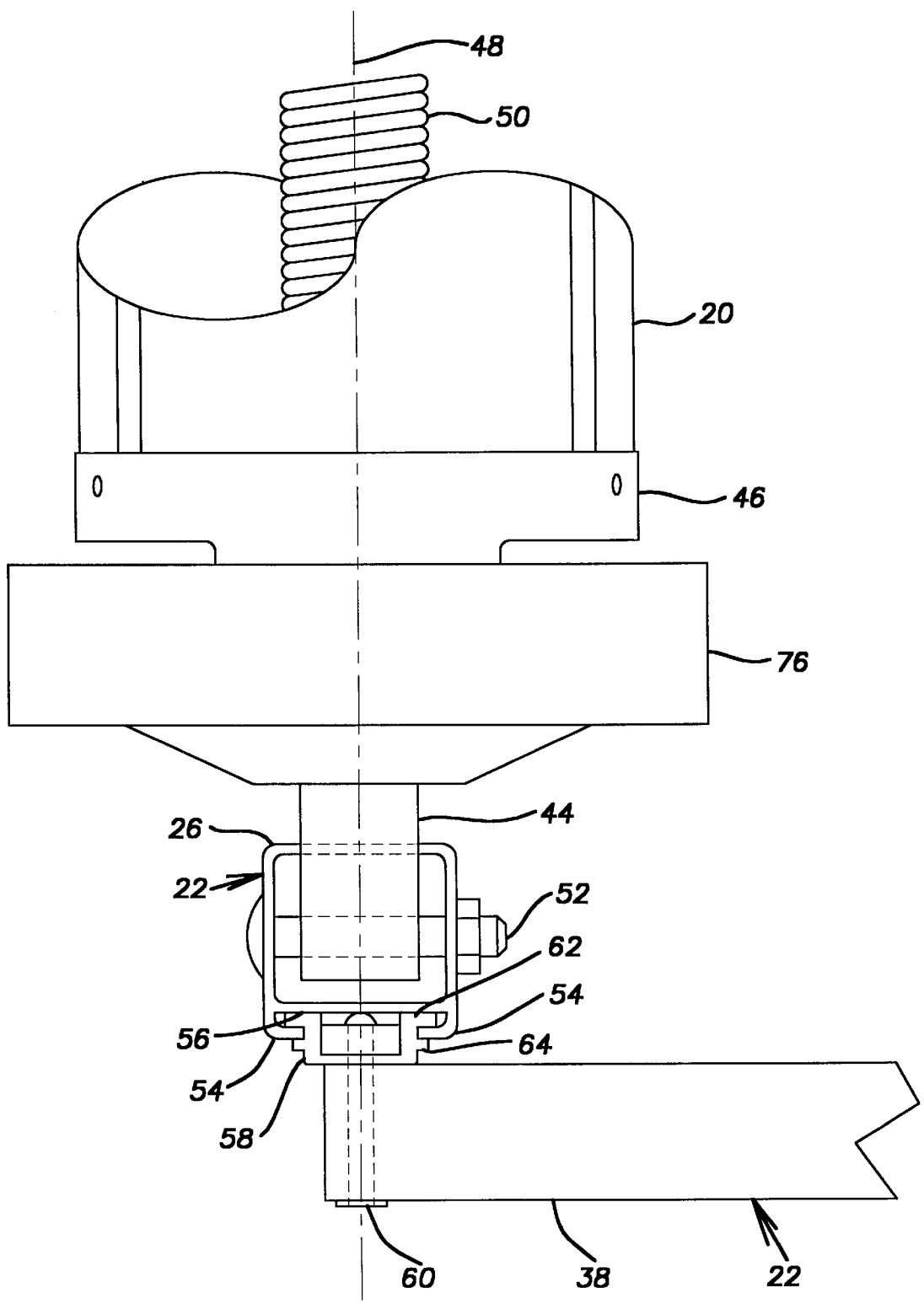
FIG. 6 is a top plan view of an end of the awning assembly of FIGS. 1 and 2.
Figure 7:
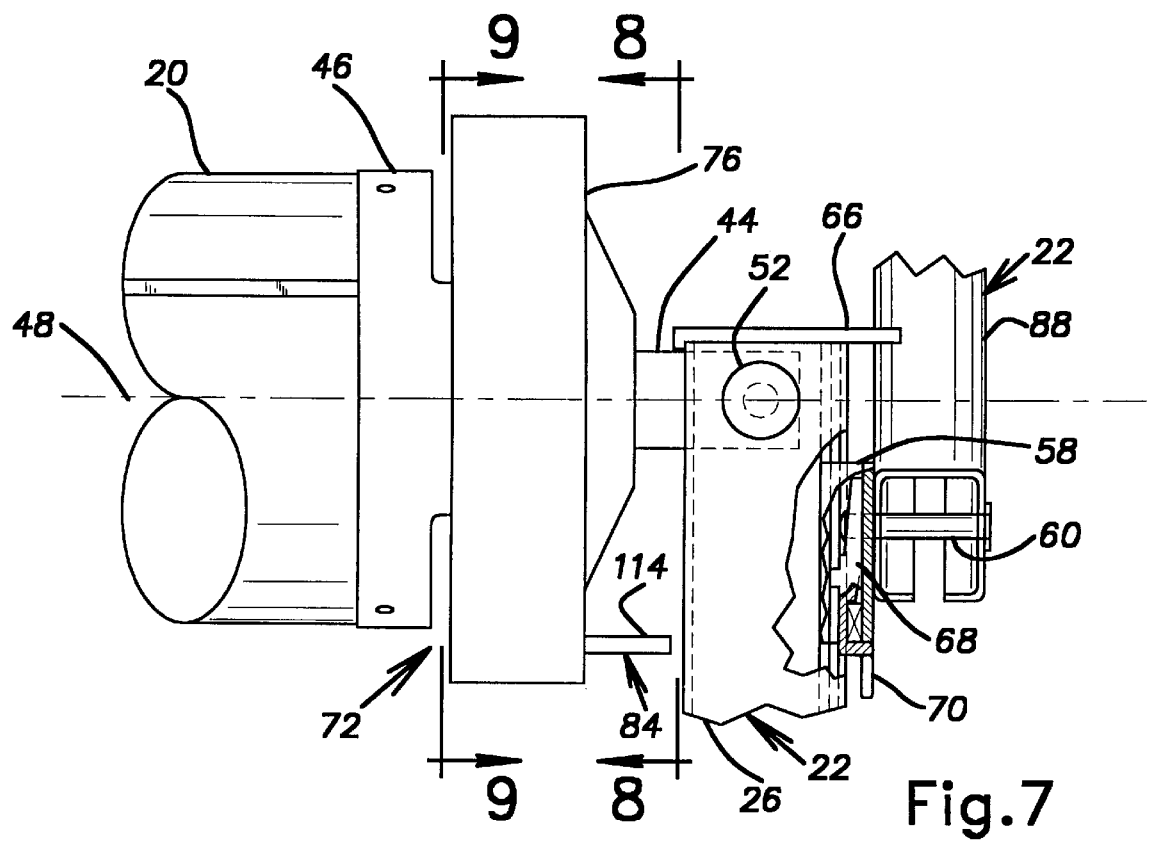
FIG. 7 is a front elevational view of an end of the awning assembly of FIGS. 1 and 2.

As best shown in FIGS. 6 and 7, the roller 20 is rotatably supported on a torsion rod 44 which can be solid or hollow. The rod 44 longitudinally extends through the center of the roller 20 and through end caps 46 disposed at ends of the roller 20. The end caps 46 close the open ends of the roller 20 and have a central opening for passage of the rod 44 therethrough. The end caps 46 are secured to the roller 20 and rotate therewith.

Idler bearings (not shown) are rotatably mounted on the rod 44 and support the roller 20 for rotation about the rod 44. A coiled torsion spring 50 extends about the rod 44 and is connected between the rod 44 near one of the end caps 46 and one of the idler bearings. The torsion spring 50 is preloaded to bias the roller 20 toward a retracted position with the awning 18 rolled thereon. The ends of the rod 44 are supported by the upper arms 26 of the support arms 22 and are secured thereto by fasteners 52 such as the illustrated nut and bolt assemblies. Mounted in this manner, the rod 44 defines a collinear support and rotational axis 48 for the roller 20.

A laterally-outside face of each upper arm 26 is provided with a pair of flanges 54 defining a longitudinally extending slide channel 56. A slider 58 is pivotally mounted to the outboard arm 38 of the rafter arm 24 on a post 60 such as the illustrated rivet. The slider 58 is made of a durable, low friction, material such as, for example, plastic. The slider 58 has pairs of inner flanges 62 and outer flanges 64 cooperating with the rafter arm flanges 54 to retain the slider 58 in the slide channel 56 and permit longitudinal sliding therein. A support arm cap 66 is disposed at the top end of the support arm 22 to limit upward travel of the slider 58. A slider lock 68 is provided which locks the outboard arm 38 of the rafter arm 24 in the position shown in FIG. 2, that is, in position wherein the slider 58 abuts the support arm cap 66. The rafter arm is manually releasable by actuating a lever 70 of the slider lock 68.

Figure 2:
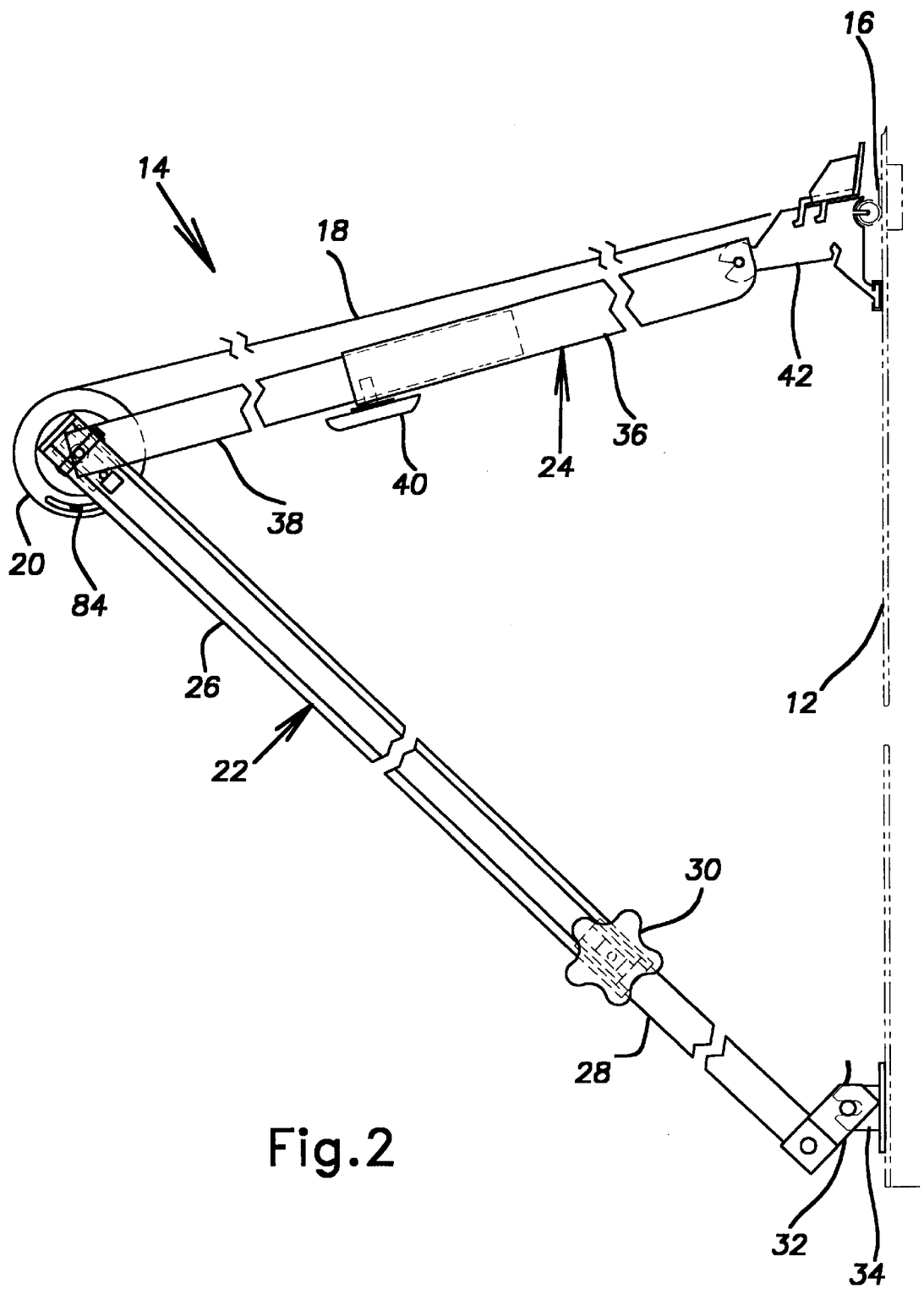
FIG. 2 is an end elevational view of the awning assembly in a fully extended position.

The rafter arms 24 and the support arms 22 are relatively slidable and pivotable between an extended position, shown in FIG. 2, and a retracted position, shown in FIGS. 4 and 5. Note that the rafter and support arm assemblies at opposite ends of the roller 20 are preferably mirror images of each other.

As best shown in FIGS. 7–10, one end of the roller 20 is provided with a lock assembly 72. The lock assembly 72 includes a gear 74, a cup-shaped support or housing 76, first and second pawls 78, 80, a spring 82, and a manually-operated selector lever 84. The outer side of the end cap 46 has an integral hub 86 which forms the gear 74. The gear 74 has a plurality of teeth 88 which each define a pair of stops. It is noted that the gear 74 can alternatively be formed separate from the end cap 46 and connected to the end cap 46 and/or roller 20 for rotation therewith.

The housing 76 faces the end of the roller 20 and has a central opening 90 for passage of the rod 44 therethrough. A pin 92 extends through the rod 44 and cooperates with a notch 94 on the outer side of the housing 76 to prevent relative rotation between the rod 44 and the housing 76. The housing 76 is sized and positioned such that the gear 74 is located within the housing 76.

The first and second pawls 78, 80 are pivotally mounted to the housing 76 by shoulder screws 96. The shoulder screws 96 mate with the housing 76 in a longitudinal direction to provide a longitudinally extending pivot axis 98 substantially perpendicular to the rotational axis 48 of the gear 74. The pawls 78, 80 are located within the housing 76 and are engageable with opposite sides of the gear 74 to selectively prevent rotation of the roller 20 relative to the rod 44. Each of the pawls 78, 80 have an opening 100 at a first end for passage of the shoulder screw 96 therethrough and a tooth 102 at a second end. The tooth 102 has a generally perpendicular first surface and an angled second surface which cooperate with the gear 74 to allow rotation of the roller 20 in one direction and prevent rotation of the roller 20 in the other direction. The side of each pawl 78, 80 adjacent the gear 74 is provided with a camming surface 104 which cooperates with the selector lever 84 to disengage the pawls 78, 80 from the gear 74. The illustrated camming surface 104 has a protrusion 106 thereon. Preferably, the first and second pawls 78, 80 are formed to be interchangeable.

The spring 82 bears inwardly against the pawls 78, 80 and urges the pawls 78, 80 into locking engagement with the gear 74. The illustrated spring 82 is a leaf spring which is formed to horizontally extend above the first and second pawls 78, 80 and downwardly extend along outer sides of the first and second pawls 78, 80. The spring 82 preferably engages the second end of the pawls 78, 80 near each tooth 102. Longitudinally extending pins 108 are provided at the inner side of the housing 76 above the pawls 78, 80 to secure the spring 82 to the housing 76.

The selector lever 84 has a hub 110 with a central opening 112 for passage of the rod 44 therethrough, a handle 114 extending from the bottom of the hub 110, and an arm 116 extending from the top of the hub 110. The hub 110 is located between the housing 76 and the end cap 46 and is rotatable about the rod 44 relative to both the housing 76 and the end cap 46. The handle 114 has a first portion which radially extends from the bottom of the hub 110 to a position near the bottom of the housing 76 and a second portion which longitudinally extends outward from the bottom of the first portion through an opening 118 in the housing 76. The opening 118 is a generally arcuate slot which permits the handle 112 to be rotated a short distance in either direction. The arm 116 has a first portion which radially extends from the top of the hub 110 to a position outward of the gear 74 and a second portion which longitudinally extends inward adjacent the gear 74 and between the pawls 78, 80. The second portion forms cam followers 120 which are sized and shaped to cooperate with the camming surfaces 104 of the pawls 78, 80 to selectively disengage the pawls 78, 80 from the gear 74.

By operation of the selector lever 84, the lock assembly 72 is movable between three positions. In the first or "locked" position, best shown in FIG. 9, the selector lever 84 is in the down or center position. In this position, the first and second pawls 78, 80 are each in engagement with the gear 74 to prevent rotation of the roller 20 relative to the rod 44 in either direction.

As best shown in FIG. 11, in the second or "roll-up" position, the selector lever 84 is rotated outwardly or counterclockwise (as viewed in FIG. 11). In this position, the first pawl 78 is disengaged from the gear 74 by the arm 114 of the selector lever 84 and the second pawl 80 is in engagement with the gear 74 to prevent counterclockwise rotation of the roller 20 relative to the rod 44 and permit clockwise rotation of the roller 20 relative to the rod 44. The spring 82 bears against the second pawl 80 to keep the second pawl 80 in locking engagement with the gear 74. The spring 82 also bears against the first pawl 78 to keep the first pawl 78 engaged against the arm 114 of the selector lever 84 with the cam follower 118 rotated beyond the protrusion 106 of the camming surface 104 to resist any tendency of the selector lever 84 to rotate clockwise from the roll-up position.

As best shown in FIG. 12, in the third or "roll-down" position, the selector lever 84 is rotated inwardly or clockwise (as viewed in FIG. 12). In this position, the second pawl 80 is disengaged from the gear 74 by the arm 114 of the selector lever 84 and the first pawl 78 is in engagement with the gear 74 to prevent clockwise rotation of the roller 20 relative to the rod 44 and allow counterclockwise rotation of the roller 20 relative to the rod 44. The spring 82 bears against the first pawl 78 to keep the first pawl 78 in locking engagement with the gear 74. The spring 82 also bears against the second pawl 80 to keep the second pawl 80 engaged against the arm 114 of the selector lever 84 with the cam follower 118 rotated beyond the protrusion 106 of the camming surface 104 to resist any tendency of the selector lever 84 to rotate counterclockwise from the roll-down position.

In operation, the support arms 22 and the rafter arms 24 are normally stowed as shown in FIGS. 4 and 5. The arms 22, 24 are spaced from the vehicle side wall 12 by the feet 32 and pivot support 42 so that the arms 22, 24 are generally parallel with each other and the side wall 12. Preferably, a releasable strap and buckle assembly 120 holds the arms 122, 124 in the parallel, stowed position. To extend the awning 18, the strap and buckle 120 are released, the rafter screw/knob assembly 40 is loosened, and the lock assembly 72 is moved to the roll-down position by operation of the selector lever 84 (as best shown in FIG. 12). As discussed above, the roller 20 is permitted to rotate in a direction which unrolls the awning 18 from the roller 20 but is prevented from rotating in a direction which rolls the awning 18 on the roller 20 when the lock assembly 72 is in the roll-down position.

Figure 3:
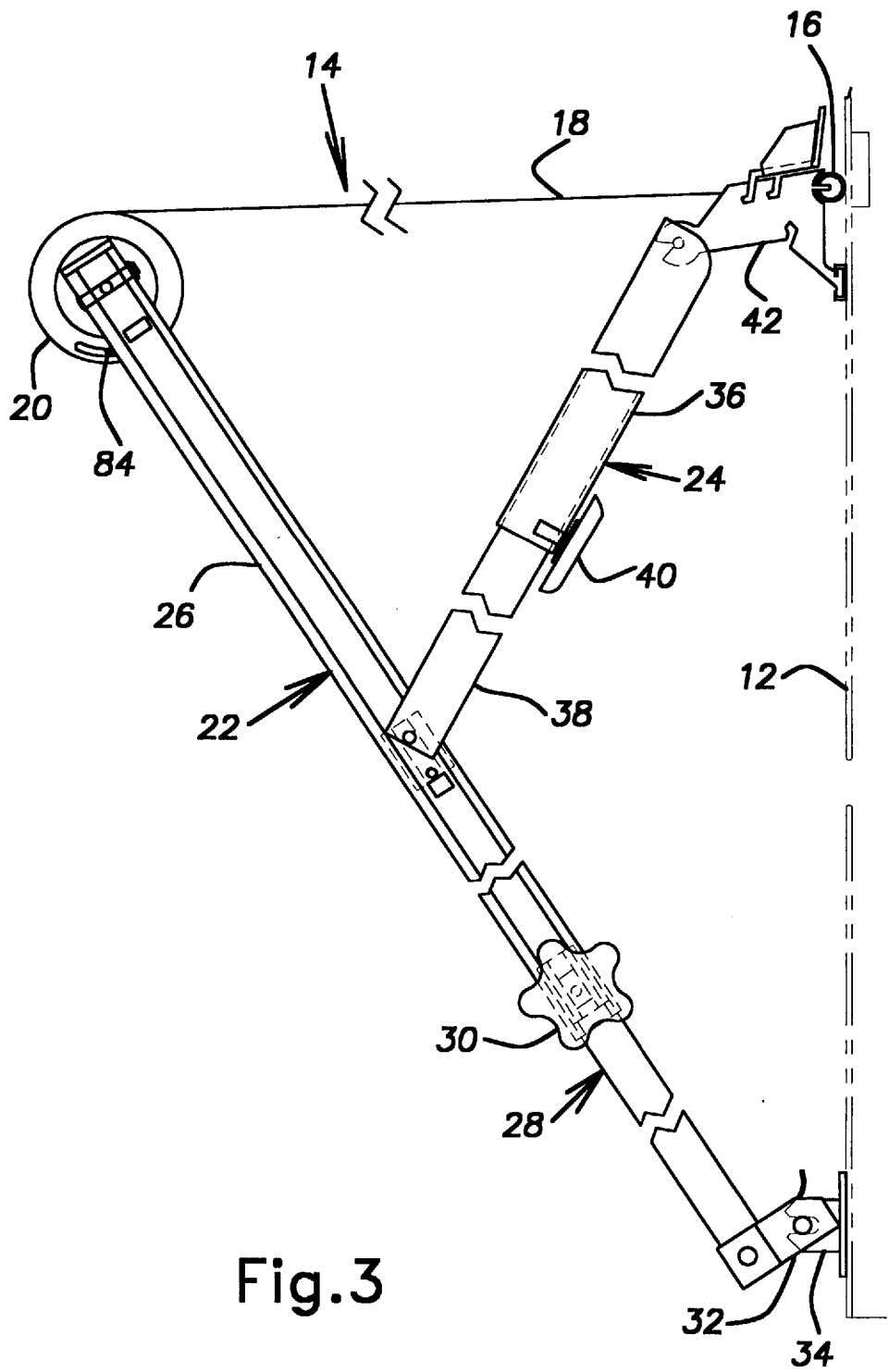
FIG. 3 is an end elevational view of the awning assembly in a partially retracted position.
Figure 8:
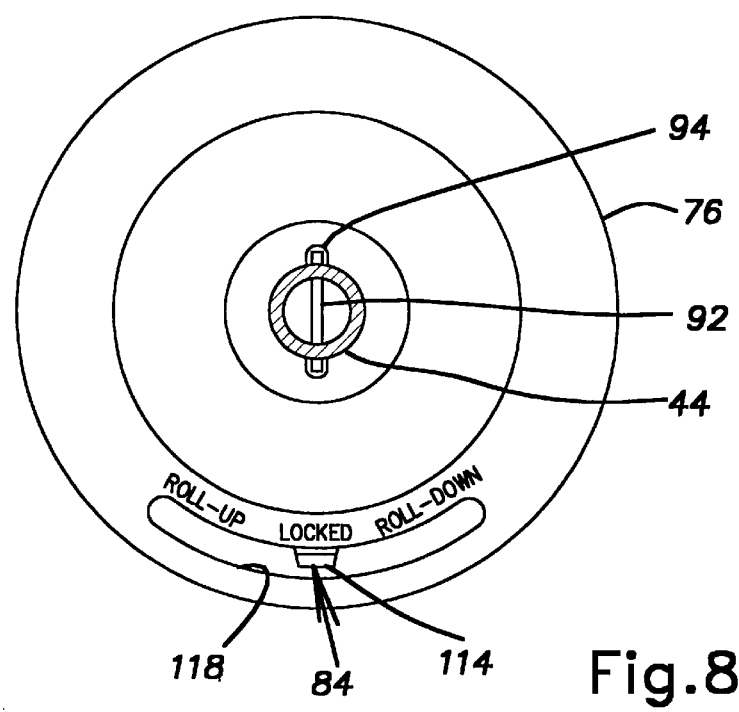
FIG. 8 is an elevational view, in cross-section, taken along line 8—8 of FIG. 7.

As best shown in FIG. 3, the roller 20 is pulled away from the vehicle side wall 12 and the awning 18 unrolls therefrom. Each outboard arm 38 slides out from its inboard arm 36 to extend the rafter arms 24. When the awning 18 is fully extended, as best shown in FIG. 2, the rafter arms 24 are slid to the tops of the support arms 22 and the sliders 58 are locked in place. The awning 18 is pulled to a desired tension and the rafter screw/knob assemblies 40 are turned to lock the rafter arms 24. The support arms 22 are extended to a desired length and locked with the support arm screw/knob assemblies 30. The lock assembly 72 is moved to the fully-locked position by operation of the selector lever 84 (as best shown in FIGS. 8 and 9). As discussed above, the roller 20 is prevented from rotating relative to the rod 44 in either direction when the lock assembly 72 is in the fully-locked position.

To retract the awning 18, the feet 32 are replaced in the foot brackets 34 and the support arms are shortened by loosening the screw/knob assemblies 30. The rafter screw/knob assemblies 40 are loosened and the slider locks 68 are released. The outboard ends of the rafter arms 24 are slid down to a position near the support arm screw/knob assemblies 30. The lock assembly 72 is moved to the roll-up position by operation of the selector lever 84 (as best shown in FIG. 11). As discussed above, the roller 20 is permitted to rotate in a direction which rolls the awning 18 on the roller 20 but is prevented from rotating in a direction which unrolls the awning 18 from the roller 20 when the lock assembly 72 is in the roll-up position.

The awning 18 is then rolled on the roller 20 as the roller 20 is moved toward the vehicle side wall. The arms 22, 24 are returned to the stowed positions as best shown in FIGS. 4 and 5, the screw/knob assemblies 30, 40 are tightened, and the strap and buckle assemblies 120 are used to secure the arms 22, 24 in the parallel, stowed position. Finally, the lock assembly 72 is moved to the fully-locked position by operation of the selector lever 84 (as best shown in FIGS. 8 and 9). As discussed above, the roller 20 is prevented from rotating relative to the rod 44 in either direction when the lock assembly 72 is in the fully-locked position. Note that the selector lever 84 of the lock assembly 72 does not rotate with the roller 20 and remains generally at the bottom of the roller 20 regardless of the position of the awning 18 so that the selector lever 84 is easily accessible at all times.

Although particular embodiments of the invention have been described in detail, it will be understood that the invention is not limited correspondingly in scope, but includes all changes and modifications coming within the spirit and terms of the claims appended hereto.

What is claimed is:

1. A lock assembly for an awning roller comprising:
    a roller adapted for having an awning rolled thereon;
    a rod defining a longitudinal axis of rotation of the roller;
    stops rigidly connected to the roller for rotation therewith about the rod;
    a support secured to said rod to prevent relative rotation therebetween;
    a first pawl pivotally mounted to said support for engaging said stops so as to prevent relative rotation between said roller and said rod in one direction; and
    a second pawl pivotally mounted to said support for engaging said stop so as to prevent relative rotation between said roller and said rod in the other direction.

2. The lock assembly according to claim 1, wherein said at least one stop is formed by teeth of a gear.

3. The lock assembly according to claim 2, wherein said roller includes a tube and an end cap secured to and closing an open end of said tube and wherein said gear is integrally formed with said end cap.

4. The lock assembly according to claim 1, further comprising means for biasing said first and second pawls toward engagement with said stops.

5. The lock assembly according to claim 4, wherein said biasing means is a leaf spring.

6. The lock assembly according to claim 1, further comprising a selector lever for selectively disengaging either of said first and second pawls from said stops.

7. The lock assembly according to claim 6, wherein said selector lever has a handle located generally at the bottom of said roller.

8. The lock assembly according to claim 6, wherein said selector lever is adapted to disengage only said first pawl in a first position and allow rotation in said one direction but prevent rotation is said other direction, to disengage only said second pawl in a second position and allow rotation in said other direction but prevent rotation in said one direction, and disengage neither of said first and second pawls in a third position and prevent rotation in both said one direction and said other direction.

9. The lock assembly according to claim 1, wherein said support is a cup-shaped housing facing the end of said roller.

10. The lock assembly according to claim 1, wherein said first and second pawls are independently mounted to said support so that said first and second pawls can simultaneously engage said stops to prevent any relative rotation between said roller and said rod.

11. A lock assembly for an awning roller comprising:

a roller adapted for having an awning rolled thereon;

a rod defining a longitudinal axis of rotation of said roller;

a gear connected to said roller for rotation therewith about said rod and having teeth forming stops;

a support secured to said rod to prevent relative rotation therebetween;

a first pawl pivotally mounted to said support for engaging said stops so as to prevent relative rotation between said roller and said rod in one direction;

a second pawl pivotally mounted to said support for engaging said stops so as to prevent relative rotation between said roller and said rod in the other direction; and a selector lever for selectively disengaging either of said first and second pawls from said stops.

12. The lock assembly according to claim 11, wherein said first and second pawls are independently mounted to said support so that said first and second pawls can simultaneously engage said stops to prevent any relative rotation between said roller and said rod.

13. The lock assembly according to claim 11, wherein said roller includes a tube and an end cap secured to and closing an open end of said tube and wherein said gear is integrally formed with said end cap.

14. The lock assembly according to claim 11, further comprising means for biasing said first and second pawls toward engagement with said stops.

15. The lock assembly according to claim 14, wherein said biasing means is a leaf spring.

16. The lock assembly according to claim 11, wherein said selector lever is adapted to disengage only said first pawl in a first position and allow rotation in said one direction but prevent rotation is said other direction, to disengage only said second pawl in a second position and allow rotation in said other direction but prevent rotation in said one direction, and disengage neither of said first and second pawls in a third position and prevent rotation in both said one direction and said other direction.

17. The lock assembly according to claim 11, wherein said selector lever has a handle located generally at the bottom of said roller.

18. The lock assembly according to claim 11, wherein said support is a cup-shaped housing facing the end of said roller.

19. The lock assembly according to claim 11, wherein said first and second pawls engage generally opposite sides of said gear.

20. A lock assembly for an awning roller comprising:

a roller adapted for having an awning rolled thereon, said roller including a tube and an end cap secured to and closing an open end of said tube;

a stationary rod defining a longitudinal axis of rotation of said roller;

a gear connected to said roller for rotation therewith about said rod and having teeth forming stops;

a cup-shaped housing facing the end of said roller and secured to said rod to prevent relative rotation therebetween;

first and second pawls pivotally mounted to said housing for engaging said stops so as to simultaneously prevent relative rotation between said roller and said rod in both directions, said first and second pawls engaging generally opposite sides of said gear, wherein said first pawl prevents relative rotation between said roller and said rod in one direction and said second pawl prevents relative rotation between said roller and said rod in the other direction;

a leaf spring biasing said first and second pawls toward engagement with said stops; and a selector lever engageable with said first and second pawls for selectively disengaging either of said first and second pawls from said stops to permit relative rotation of said roller and said rod in one of said directions.

21. The lock assembly according to claim 20, wherein said gear is integrally formed with said end cap.

22. The lock assembly according to claim 20, wherein said selector lever has a handle extending through said housing generally at the bottom of said housing.

* * * * *